(12) United States Patent
Hashimura et al.

(10) Patent No.: US 8,900,389 B2
(45) Date of Patent: Dec. 2, 2014

(54) METHOD FOR PRODUCING PNEUMATIC TIRE

(75) Inventors: Yoshiaki Hashimura, Hiratsuka (JP); Yoshiaki Kirino, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1196 days.

(21) Appl. No.: 12/278,707

(22) PCT Filed: Mar. 29, 2007

(86) PCT No.: PCT/JP2007/056767
§ 371 (c)(1),
(2), (4) Date: Aug. 7, 2008

(87) PCT Pub. No.: WO2007/114204
PCT Pub. Date: Oct. 11, 2007

(65) Prior Publication Data
US 2009/0173431 A1    Jul. 9, 2009

(30) Foreign Application Priority Data
Mar. 29, 2006  (JP) ................................. 2006-090536

(51) Int. Cl.
| | | |
|---|---|---|
| *B29D 30/16* | (2006.01) | |
| *B60C 5/14* | (2006.01) | |
| *B29D 30/06* | (2006.01) | |
| *B29D 30/30* | (2006.01) | |

(52) U.S. Cl.
CPC ............. *B60C 5/14* (2013.01); *B29D 30/0681* (2013.01); *B29D 30/3007* (2013.01); *B29D 2030/0682* (2013.01)
USPC ....................................................... 156/123

(58) Field of Classification Search
CPC ................... B29D 2030/0682; B29D 30/3007; B60C 5/14
USPC ........................................................... 156/123
See application file for complete search history.

(56) References Cited

U.S. PATENT DOCUMENTS

| | | | | |
|---|---|---|---|---|
| 5,938,869 | A * | 8/1999 | Kaido et al. .................. | 152/510 |
| 6,079,466 | A | 6/2000 | Watanabe et al. | |
| 6,477,894 | B1 * | 11/2002 | Koch et al. ...................... | 73/146 |
| 2005/0217774 | A1 | 10/2005 | Borot | |

FOREIGN PATENT DOCUMENTS

| | | |
|---|---|---|
| DE | 41 11 448 | 10/1992 |
| DE | 4111448 A1 * | 10/1992 |
| EP | 1 145 872 | 10/2001 |
| FR | 2 299 978 | 9/1976 |

(Continued)

*Primary Examiner* — Philip Tucker
*Assistant Examiner* — Vicki Wu
(74) *Attorney, Agent, or Firm* — Greer Burns & Crain Ltd.

(57) ABSTRACT

A method for producing a pneumatic tire according to the present invention can use existing facilities without change and does not make the spliced parts of an inner liner easily opened even if the tire is produced with use of an inner liner having a low adhesion.

In a method for producing a pneumatic tire having steps of winding an inner liner 8' around a tire building drum 21 to form a cylindrical body, the cylindrical body is formed by attaching a winding-starting end 8'$a$ of the inner liner 8' to the building drum 21 via an uncured tacky member 9', winding the inner liner 8' attached to the building drum 21 around the building drum 21, and splicing a winding-finishing end side of the wound inner liner 8' with the winding-starting end 8'$a$ of the inner liner 8' via the uncured tacky member 9'.

10 Claims, 3 Drawing Sheets

(56) References Cited

FOREIGN PATENT DOCUMENTS

| JP | U 62-121923 | | | 8/1987 |
|----|----|----|----|----|
| JP | 06055661 | A | * | 3/1994 |
| JP | A 6-55661 | | | 3/1994 |
| JP | 06156007 | A | * | 6/1994 |
| JP | 08244402 | A | * | 9/1996 |
| JP | A 8-244402 | | | 9/1996 |
| JP | 10006414 | A | * | 1/1998 |
| JP | A 10-6414 | | | 1/1998 |
| JP | A 10-35232 | | | 2/1998 |
| JP | A 2004-148953 | | | 5/2004 |
| JP | A 2004-351810 | | | 12/2004 |
| JP | 2005068173 | A | * | 3/2005 |
| JP | A 2005-297963 | | | 10/2005 |

* cited by examiner

METHOD FOR PRODUCING PNEUMATIC TIRE

This application is a U.S. National Phase under 35 U.S.C. §371, of International Application No. PCT/JP2007/056767, filed Mar. 29, 2007.

TECHNICAL FIELD

The present invention relates to methods for producing pneumatic tires, and more particularly, to a method for producing a pneumatic tire which can use existing facilities without change and does not make the spliced parts of an inner liner easily opened even if the tire is produced with use of an inner liner having a low adhesion.

TECHNICAL BACKGROUND

There have been proposed pneumatic tires having an inner liner disposed beside the tire cavity as an air impermeable layer, the inner liner comprising a film formed of a thermoplastic resin as a main component instead of a conventional rubber in order to lighten the tire (see a patent document 1, for example).

Processes for producing such pneumatic tires include a process for winding a sheet-shaped film around a tire building drum of metal to form a cylindrical inner liner. Since the film has a low adhesion, adhesion between the film and the building drum is insufficient when the film has been wound around the building drum. As a result, the film is apt to fall off the building drum, and a problem is that it is difficult to wind the film around the building drum.

In order to solve the above problem, it is useful to provide a suction structure for suctioning the film on the building drum to hold it with use of negative pressure. However, it is required to newly provide the suction structure, and existing facilities can not be used without modification, which causes a problem of an increase in facility cost.

Further, the cylindrical inner liner is formed by splicing the winding-starting end and winding-finishing end of the sheet-shaped film. The film, however, has a low adhesion, and another problem is that, even if the inner liner can be formed by splicing the ends of the film, the spliced parts are easily opened when lifting is applied to the inner liner in a tire producing process.

Patent Document 1: Japanese Patent Application Kokai Publication HEI 10-35232

DISCLOSURE OF THE INVENTION

Problems to be Solved by the Invention

An object of the present invention is to provide a method for producing a pneumatic tire which can use existing facilities without change and does not make the spliced part of an inner liner easily opened even if the tire is produced with use of an inner liner having a low adhesion.

Means for Solving the Problem

In order to achieve the above object, the present invention provides a method for producing a pneumatic tire having steps of winding an inner liner around a tire building drum to form a cylindrical body, the steps comprising: attaching a winding-starting end of the inner liner to the building drum via an uncured tacky member; winding the inner liner attached to the building drum around the building drum; and splicing a winding-finishing end side of the wound inner liner with the winding-starting end of the inner liner via the uncured tacky member to form the cylindrical body.

Effect of the Invention

According to the present invention described above, the winding-starting end of the inner liner is attached to the building drum via the uncured tacky member, and the winding-finishing end side of the inner liner wound around the building drum is spliced with the winding-starting end of the inner liner via the uncured tacky member. Therefore, even when an inner liner having a low adhesion is used, the inner liner does not fall off the building drum. Accordingly, without providing a new suction structure, existing facilities can be used with no change.

Since the winding-starting end and winding-finishing end side of the inner liner are spliced with each other via the uncured tacky member, the spliced parts of the inner liner are not easily opened when lifting is applied to the inner liner during producing.

DESCRIPTION OF THE SYMBOLS

8' inner liner
8'a winding-starting end
8'b winding-finishing end
9', 9" tacky member
9'm one side portion
9'x, 9"x extension portion
21 building drum
L1, L2 drum circumferential direction length
t thickness

BEST MODES FOR CARRYING OUT THE INVENTION

Embodiments of the present invention will be described in detail below with reference to the attached drawings.

Figure 1:
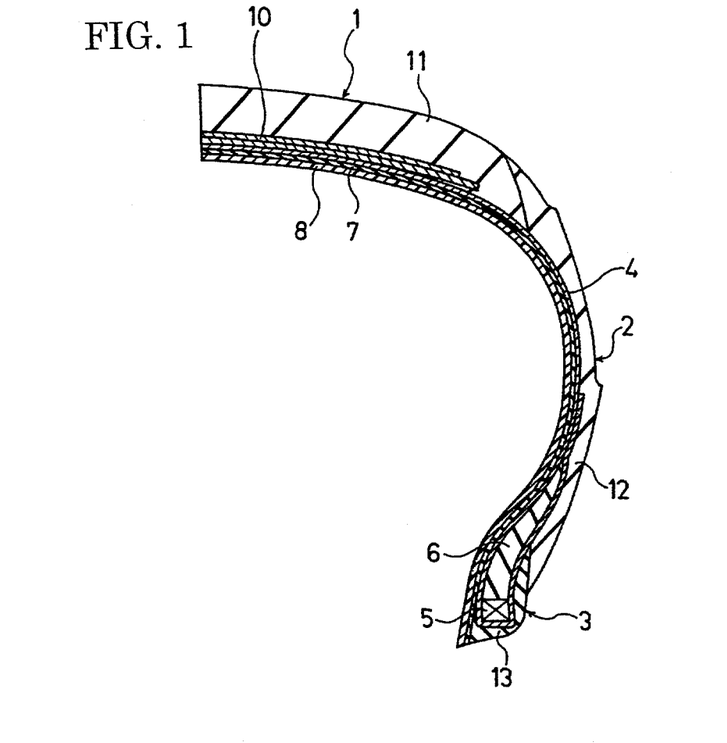
FIG. 1 is a partial cross-sectional view showing an example of a pneumatic tire produced according to a first embodiment of a method for producing a pneumatic tire according to the present invention.

Referring to FIG. 1, there is shown an example of a pneumatic tire produced according to a first embodiment of a method for producing a pneumatic tire according to the present invention; reference numeral 1 denotes a tread portion, reference numeral 2 a sidewall portion, and reference numeral 3 a bead portion.

A carcass ply 4 extends between the right and left bead portions 3 inside the tire. The carcass ply has a rubber layer and reinforcing cords embedded therein. The reinforcing cords, which extend in the radial direction of the tire, are arranged at prescribed intervals in the circumferential direction of the tire. The carcass ply has opposite ends, which are turned up around bead cores 5 embedded in the bead portions 3 from the inner side of the tire toward the outer side with bead fillers 6 being sandwiched. An inner liner 8 is disposed inward of the carcass ply 4 via a tying rubber layer 7 for securing a good adhesion to the carcass ply 4.

Figure 2:
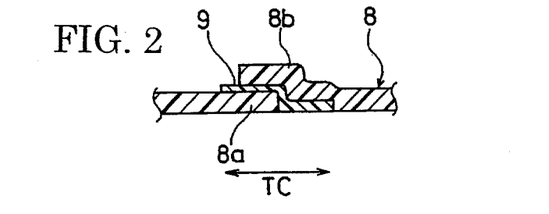
FIG. 2 is an enlarged cross-sectional view showing the opposite ends of the inner liner of the pneumatic tire of FIG. 1, the opposite ends being spliced via a tacky member.

The inner liner 8 comprises a film formed of a thermoplastic resin or thermoplastic elastomer composition comprising a blend of a thermoplastic resin and an elastomer, and acts as an air impermeable layer. As shown in FIG. 2, the inner liner 8 has opposite ends 8a and 8b in the circumferential direction TC of the tire, which are spliced with each other in an overlapping manner via a tape-shaped tacky member 9 having the same length in the widthwise direction of the tire as that of the inner liner 8 to form a cylindrical body.

For the thermoplastic resin and thermoplastic elastomer composition used for the inner liner 8, conventionally known ones (see Japanese Patent Application Kokai Publication HEI 10-35232, for example) can be used; examples of the thermoplastic resin may include polyamide resins and polyester resins, and examples of the thermoplastic elastomer composition may include a blend of one of the above thermoplastic resins and diene rubber or olefin rubber as elastomer.

A plurality of belt plies 10 are provided radially outwardly of the carcass ply 4 in the tread portion 1. A tread rubber layer 11 is placed radially outwardly of the belt plies 10. A side rubber layer 12 is disposed outward of the carcass ply 4 in each sidewall portion 2, and a cushion rubber layer 13 is provided outward of the turned-up portion of the carcass ply 4 in each bead portion 3.

A method for producing the pneumatic tire of FIG. 1 will be described below according to the producing method of the present invention with reference to FIGS. 3 to 7.

Figure 3:
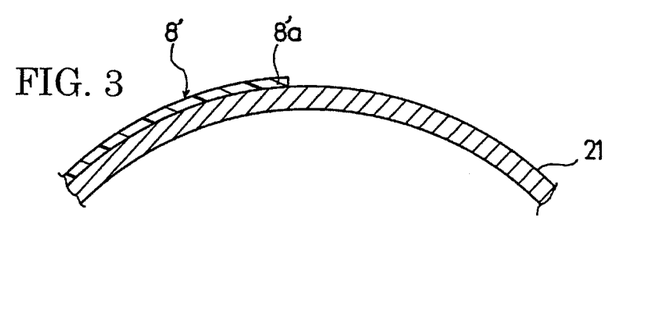
FIG. 3 is a cross-sectional view showing a step of putting a winding-starting end of the inner liner on a building drum in the first embodiment of a method for producing a pneumatic tire according to the present invention.
Figure 4:
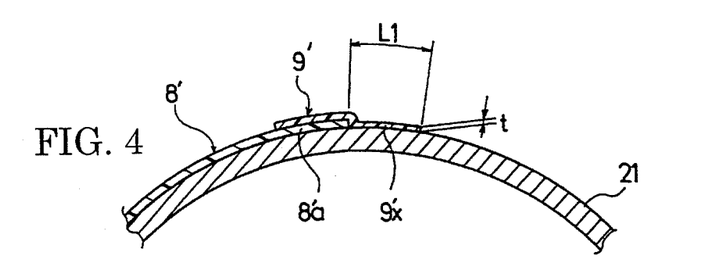
FIG. 4 is a cross-sectional view showing a step of applying the tacky member in the first embodiment of a method for producing a pneumatic tire according to the present invention.

First, as shown in FIG. 3, the winding-starting end (one end) 8'a of a sheet-shaped inner liner 8' is put on a metallic building drum 21. Next, as shown in FIG. 4, one side of an uncured tape-shaped tacky member 9' is applied to the winding-starting end 8'a of the inner liner 8'; meanwhile, the other side (an extension portion 9'x extending outward of the winding-starting end 8'a) is applied to the building drum 21, whereby the winding-starting end 8'a of the inner liner 8' is attached to the building drum 21 so as not to fall off by the tacky member 9' applied to the winding-starting end 8'a of the inner liner 8'.

Figure 5:
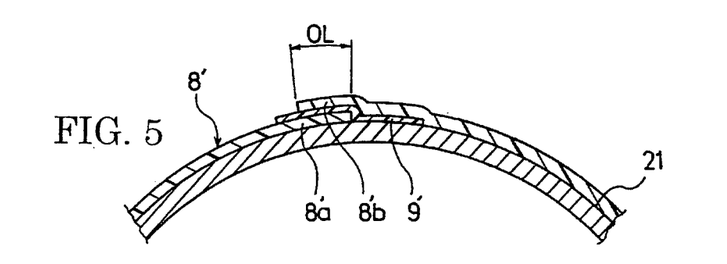
FIG. 5 is a cross-sectional view showing a step of applying a winding-finishing end of the inner liner in the first embodiment of a method for producing a pneumatic tire according to the present invention.

Once attachment of the winding-starting end 8'a of the inner liner 8' is completed, the building drum 21 is rotated one revolution to wind the inner liner 8' fully around the building drum 21. Then, as shown in FIG. 5, the winding-finishing end (the other end) 8'b of the wound inner liner 8' is applied onto the tacky member 9' that has been applied onto the winding-starting end 8'a of the inner liner 8', whereby the opposite ends 8'a and 8'b of the inner liner 8' are spliced with each other via the tacky member 9' to form a cylindrical body.

For the tacky member 9', any tacky material may be used if the winding-starting end 8'a of the inner liner 8' can be held on the building drum 21 and the spliced state can be maintained in such a manner that the opposite spliced ends 8'a and 8'b of the inner liner 8' are not opened when lifting described later is applied thereto. One containing, for example, an epoxidized styrene-butadiene-styrene block copolymer is preferably used. The same goes for an uncured sheet-shaped tacky member 9" described later.

It is generally preferable that the adhesion of the tacky member 9' be higher. However, if it is excessively high, it is difficult to remove a first formed assembly 22 described later from the building drum 22. On the other hand, if the adhesion of the tacky member 9' is too weak, the winding-starting end 8'a of the inner liner 8' can not be held on the building drum 21, and the opposite spliced ends 8'a and 8'b of the inner liner 8' is apt to open. Therefore, one suitable for the type and size of a tire used is selected.

Figure 6:
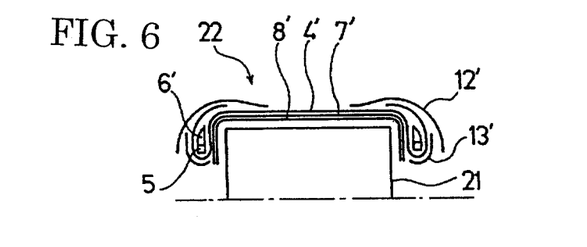
FIG. 6 is an explanatory drawing illustrating a step of forming a first formed assembly on the building drum in the first embodiment of a method for producing a pneumatic tire according to the present invention.

After the cylindrical inner liner 8' is formed, a first formed assembly 22 is formed by applying an unvulcanized tying rubber layer 7', an unvulcanized carcass ply 4', bead cores 5 with an unvulcanized bead filler 6', unvulcanized cushion rubber layers 13', and unvulcanized side rubber layers 12' as is conventional (see FIG. 6).

Figure 7:
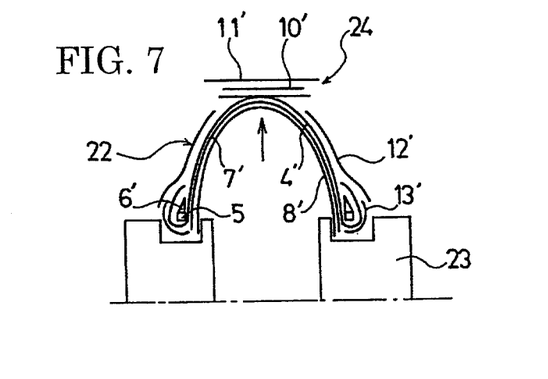
FIG. 7 is an explanatory drawing illustrating a step of building a green tire by inflating the first formed assembly and pressing it against a second formed assembly in the first embodiment of a method for producing a pneumatic tire according to the present invention.

The first formed assembly 22 is removed from the building drum 21, mounted on a shaping drum 23 and internally pressurized as shown in FIG. 7, thereby applying lifting to the first formed assembly 22. Since the opposite ends 8'a and 8'b of the cylindrical inner liner 8' are spliced via the tacky member 9', the opposite ends 8'a and 8'b of the cylindrical inner liner 8' are not easily opened when lifting is applied.

The first formed assembly 22 is toroidally inflated by lifting and pressed against the radially inner side of a second formed assembly 24 disposed radially outwardly thereof to form a green tire, the second formed assembly comprising unvulcanized belt plies 10' and an unvulcanized tread rubber layer 11' disposed radially outwardly thereof. The green tire is set in a tire curing press and vulcanized to obtain a pneumatic tire of FIG. 1.

According to the present invention described above, when the inner liner 8' is wound around the building drum 21 to form the cylindrical body, the winding-starting end 8'a of the inner liner 8' is attached to the building drum 21 via the tacky member 9', and the winding-finishing end 8'b of the wound inner liner 8' is spliced with the winding-starting end 8'a of the inner liner 8' via the tacky member 9'. Therefore, even when a film of a thermoplastic resin or thermoplastic elastomer composition having a low adhesion is used for the inner liner 8', the inner liner 8' does not fall off the building drum 21.

Accordingly, without providing a new suction structure, existing facilities can be used with no change.

Since the winding-starting end 8'a and winding-finishing end 8'b of the inner liner 8' are spliced with each other via the tacky member 9', the opposite spliced ends 8'a and 8'b of the cylindrical inner liner 8' are not easily opened when lifting is applied to the cylindrical inner liner 8' during producing.

Figure 8:
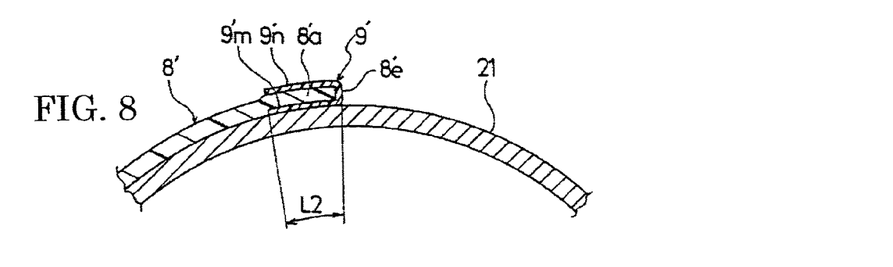
FIG. 8 is a cross-sectional view showing a step of attaching the winding-starting end of the inner liner to the building drum in a second embodiment of a method for producing a pneumatic tire according to the present invention.
Figure 9:
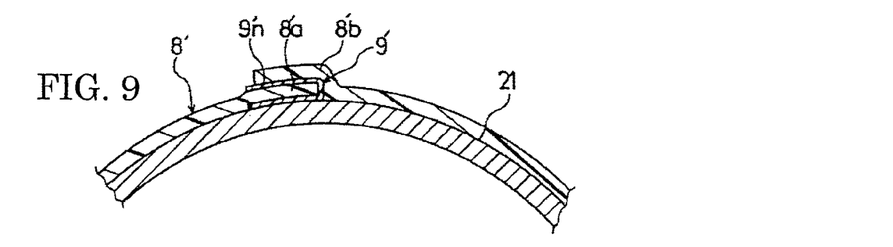
FIG. 9 is a cross-sectional view showing a step of applying the winding-finishing end of the inner liner in the second embodiment of a method for producing a pneumatic tire according to the present invention.

Referring to FIGS. 8 and 9, there is shown a main part of a second embodiment of a method for producing a pneumatic tire according to the present invention. In this second embodiment, an uncured tape-shaped tacky member 9' is folded back at an edge 8'e of the winding-starting end 8'a of the sheet-shaped inner liner 8', and one side portion 9'm and the other side portion 9'n of the tacky member 9' are applied to the inner surface and outer surface of the winding-starting end 8'a of the inner liner 8' in advance. Thus the inner liner 8' is preliminarily structured so as to have the uncured tacky member 9' on the inner surface and outer surface of the winding-starting end 8'a, and a pneumatic tire is produced using it.

More specifically, as shown in FIG. 8, the inner surface of the winding-starting end 8'a of the inner liner 8' is applied onto the building drum 21 via the tacky member 9'. After application, the building drum 21 is rotated one revolution to wind the inner liner 8' fully around the building drum 21. Next, as shown in FIG. 9, the winding-finishing end 8'b of the wound inner liner 8' is applied onto the other side portion 9'n of the tacky member 9' that has been applied to the outer surface of the winding-starting end 8'a of the inner liner 8', whereby the opposite ends 8'a and 8'b of the inner liner 8' are spliced with each other in an overlapping manner via the tacky member 9' to form a cylindrical body. Subsequent processes are the same as the above. Even when a pneumatic tire is produced as described above, the same effects as the above can be obtained.

Figure 10:
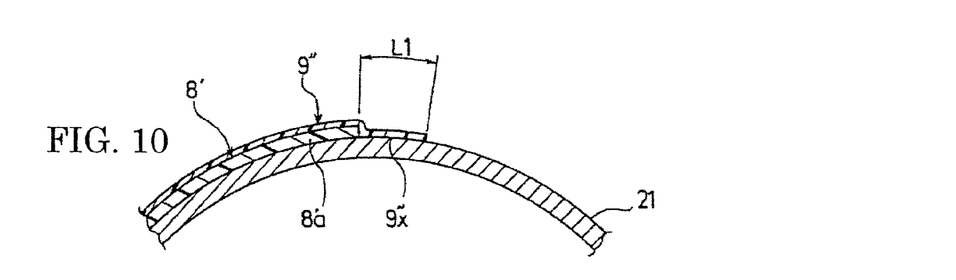
FIG. 10 is a cross-sectional view showing a step of attaching the winding-starting end of the inner liner to the building drum in a third embodiment of a method for producing a pneumatic tire according to the present invention.
Figure 11:
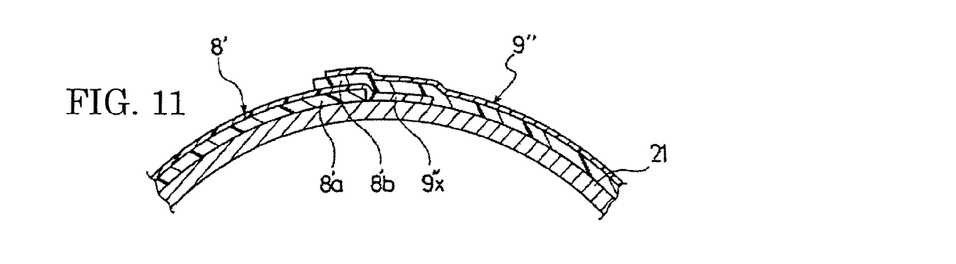
FIG. 11 is a cross-sectional view showing a step of applying the winding-finishing end of the inner liner in the third embodiment of a method for producing a pneumatic tire according to the present invention.

Referring to FIGS. 10 and 11, there is shown a main part of a third embodiment of a method for producing a pneumatic tire according to the present invention. In this third embodiment, the sheet-shaped inner liner 8' has an uncured sheet-shaped tacky member 9" preliminarily applied to the entire outer surface from the winding-starting end 8'a to winding-finishing end 8'b. The tacky member 9" has an extension portion 9"x which extends outward of the winding-starting end 8'a of the inner liner 8'.

In the case of the inner liner 8' with the uncured sheet-shaped tacky member 9" preliminarily applied to the outer surface as described above, as shown in FIG. 10, the winding-starting end 8'a of the inner liner 8' is attached onto the building drum 21 by applying the extension portion 9"x to the building drum 21. The building drum 21 is rotated one revolution to wind the inner liner 8' fully around the building drum 21. Thereafter, as shown in FIG. 11, the winding-finishing end 8'b of the wound inner liner 8' is applied onto a portion of the tacky member 9" that has been applied to the outer surface of the winding-starting end 8'a of the inner liner 8', whereby the opposite ends 8'a and 8'b of the inner liner 8' are spliced with each other in an overlapping manner via the tacky member 9" to form a cylindrical inner liner 8'. Subsequent processes are the same as the above. This also allows the same effects as the above to be obtained.

In the third embodiment, the tacky member 9" is provided on the entire outer surface of the inner liner 8'. Therefore, the opposite ends 8'a and 8'b of the inner liner 8' may be spliced with each other in a butting manner via the tacky member 9" in the alternative of splicing in the overlapping manner. In the case where the opposite ends 8'a and 8'b of the inner liner 8' are spliced with each other in the overlapping manner via the tacky member 9", it is sufficient to use an uncured tape-shaped tacky member (tacky member 9' in FIG. 4) which has an extension portion extending outward of the winding-starting end 8'a of the inner liner 8' and is applied to at least an outer surface of the winding-starting end 8'a of the inner liner 8', in the alternative of the tacky member 9".

In the present invention, the thickness t of the uncured tacky member 9', 9" is preferably in the range of 0.3 mm to 3.0 mm, and is properly selected according to the type and size of a tire. If the thickness t of the tacky member 9', 9" is less than 0.3 mm, it is not preferable because the tacky member 9', 9" is apt to deform. If the thickness t of the tacky member 9', 9" is beyond 3.0 mm, it is not desirable from the viewpoint of weight. The thickness t of the tacky member 9', 9" can generally be about 0.4 to 1.5 mm in the case of pneumatic tires for passenger cars, and about 0.5 to 2.5 mm in the case of heavy duty pneumatic tires.

The length L1, in the circumferential direction of the drum, of the extension portion 9'x, 9"x of the tacky member 9', 9" adhered to the building drum 21, and the length L2, in the circumferential direction of the drum, of the one side portion 9'm of the tacky member 9' are preferably equal to or more than 5 mm, respectively, in order to securely attach the inner liner 8'. The upper limits of the drum circumferential direction lengths L1 and L2 are dependent on adhesion, but in general, are preferably equal to or more than 15 mm from the viewpoint of facilitating a removal operation of the first formed assembly 22, the tacky member 9', 9" of which is adhered tightly to the building drum 21, from the building drum 21.

In the case where the opposite ends 8'a and 8'b of the inner liner 8' are spliced with each other in the overlapping manner, the overlapping length OL is preferably equal to or more than 3 mm from the viewpoint of preventing the opposite spliced ends 8'a and 8'b of the inner liner 8' from opening during lifting. The upper limit of the overlapping length OL is preferably equal to or less than 10 mm. The overlapping length OL is more preferably about 3 mm to 5 mm.

The length, in the widthwise direction of the tire, of the tacky member 9' and 9" is desirably the same as that of the inner liner 8' as described above in light of securely attaching the inner liner 8' to the building drum 21 and preventing the opposite spliced ends 8'a and 8'b of the inner liner 8' from opening during lifting. However, it may be less than that, and can be properly selected. The tire widthwise direction length of the tacky member 9', and 9" is preferably the same as that of at least a region which is located between the right and left unvulcanized bead fillers 6' and receives relatively great deformation during lifting.

The above embodiments show examples of the inner liner 8' formed from a film of a thermoplastic resin or thermoplastic elastomer composition. However, the inner liner may be one having the film and a rubber layer laminated outward thereof. It is sufficient for the inner liner 8' to have at least the film on a side facing the building drum 21.

The inner liner 8' that is weak in adhesion is not limited to the above-described film of a thermoplastic resin or thermoplastic elastomer composition. The inner liner may be any inner liner if it is formed of a material which is weak in adhesion. The inner liner may be one formed of, for example, rubber (butyl rubber or diene rubber, for example) having a weak adhesion. The inner liner may also be one formed from a plurality of plies including a film of a thermoplastic resin or thermoplastic elastomer composition and a layer of rubber with a weak adhesion laminated thereon.

Figure 12:
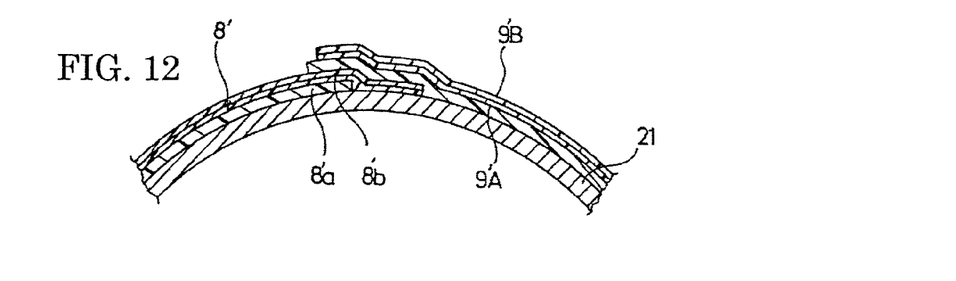
FIG. 12 is a main cross-sectional view showing another example of the tacky member.

The above embodiments each show an example of using the uncured tacky member 9', 9" of one layer. However, an uncured tacky member formed from a plurality of layers may be used. In the case of the uncured tacky member formed from a plurality of layers, it is preferable that it comprise at least two uncured tacky layers 9'A and 9'B having different adhesions as shown in FIG. 12, and that the inner tacky layer 9'A facing the building drum 21 is lower in adhesion than the outer tacky layer 9'B disposed outward thereof, whereby, while splice of the opposite ends 8'a and 8'b of the inner liner 8' is secured, adhesion between the building drum 21 and the inner tacky layer 9'A is lowered, enabling a removal operation of the first formed assembly 22 from the building drum 21 to be facilitated.

The pneumatic tire produced according to the method of the present invention is not limited to the above-described pneumatic tire having a construction shown in FIG. 1, but may be one having, for example, an inner liner 8' directly disposed inwardly of the carcass ply 4 with no tying rubber layer 7. In the above embodiments, the inner liner 8' is wound fully around the building drum 21 to splice the winding-starting end 8'a with the winding-finishing end 8'b via the uncured tacky member 9', 9". However, the inner liner 8' may be wound beyond one circle; in this case, the winding-starting end 8'a of the inner liner 8' can be spliced with a winding-finishing end side portion of the inner liner 8' at a location corresponding to the winding-starting end 8'a via the uncured tacky member 9', 9".

member is also shown in Table 1. It should be noted that as a tire curing press having the building drum, an existing one having no suction structure for suctioning and holding an inner liner was used.

Inner Liner Attachment Condition

A condition when the inner liner was attached to the building drum was visually observed, and was judged from the result thereof on three levels of ○, Δ, and X. ○ means that the inner liner was attached to the building drum without any problems. Δ means that the inner liner was attached to the building drum, but the uncured tacky member was deformed and the inner liner partially fell off the building drum. X means that the inner liner could not be attached to the building drum.

Inner Liner Opposite Ends Splice Condition

The green tire was cannibalized, and a splice condition of the opposite ends of the inner liner spliced in an overlapping manner was visually observed and was judged from the result thereof on two levels of ○ and X. ○ means that the opposite ends of the inner liner was spliced and there was no opening. X means that the opposite ends of the inner liner was opened and not spliced.

TABLE 1

|  | Comparative Example | Present Example 1 | Present Example 2 | Present Example 3 | Present Example 4 |
|---|---|---|---|---|---|
| Existence or Nonexistence of Tacky Member | Nonexistence | Existence | Existence | Existence | Existence |
| Thickness t (mm) | — | 0.3 | 0.5 | 0.5 | 0.5 |
| Drum Circumferential Direction Length L1 (mm) | — | 15 | 5 | 40 | 3 |
| Inner Liner Attachment Condition | X | Δ Deformation | ○ | ○K | Δ Partially Fall |
| Inner Liner Splice Condition | — | ○ | ○ | ○ | ○ |

Note)
K in the table means that the uncured tacky member is adhered and a removal operation of the first formed assembly from the building drum is slightly deteriorated.

The present invention can be applied to any if it is a method for producing a pneumatic tire with use of an inner liner 8' having a weak adhesion.

EXAMPLE

Green tires each having a construction shown in FIG. 1 and a tire size of 195/65R15 were built with use of uncured tape-shaped tacky members (composition in Table 2) having thicknesses t and drum circumferential direction lengths L1 of their extension portions shown in Table 1 (present examples 1 to 4). An attachment condition of each inner liner to the building drum and a splice condition of the opposite ends of the inner liner of each green tire built were checked according to the following manners, obtaining the results shown in Table 1.

As a comparative example, the result when an inner liner was attached to the building drum without using an tacky

TABLE 2

| Blending Name | Blending Rate (part by weight) | Trade Name | Manufacturer Name |
|---|---|---|---|
| SBS | 50.00 | Tahupuren315P | Asahi Chemical Industry Co., Ltd. |
| ESBS | 50.00 | EpohurendoAT501 | Daicel Chemical Industries, Ltd. |
| Tackifier | 80.00 | YSresin D-105 | Yasuhara Chemical Co., Ltd. |
| Zinc | 5.00 | Zinc 3 | Seido Chemical Co., Ltd. |
| Stearic Acid | 0.50 | Bead Stearic Acid | NOF Corporaion |
| Peroxide | 0.50 | Pakadokkusu14 | Kayaku Akzo Co., Ltd. |

Note)
a) SBS is an abbreviation of styrene-butadiene-styrene block copolymer.
b) ESBS is an abbreviation of epoxidized styrene-butadiene-styrene block copolymer.

As seen from Table 1, the pneumatic tire producing method of the present invention can produce a pneumatic tire without opening the spliced opposite ends of the inner liner while existing facilities are used without modification; accordingly, the pneumatic tire producing method of the present invention can use existing facilities without change and does not make the spliced parts of an inner liner easily opened even if the pneumatic tire is produced with use of an inner liner having a low adhesion.

INDUSTRIAL APPLICABILITY

The method for producing a pneumatic tire according to the present invention having the aforementioned excellent effects is preferably applicable to production of a pneumatic tire having a inner liner with a low adhesion.

What is claimed is:

1. A method for producing a pneumatic tire having steps of winding an inner liner around a tire building drum to form a cylindrical body, the steps comprising:
   attaching a winding-starting end of the inner liner directly to the building drum using an uncured tacky member;
   winding the inner liner attached to the building drum around the building drum;
   splicing a winding-finishing end of the wound inner liner with the winding-starting end of the inner liner via the uncured tacky member to form the cylindrical body, body;
   applying a tying rubber layer to the inner liner; and
   applying an unvulcanized carcass ply to the tying rubber layer,
   wherein the uncured tacky member is an uncured tape-shaped tacky member having an adhesive property on both surfaces thereof enabling adhesion to the winding-starting and winding-finishing ends of the inner liner and to the building drum, the attaching step comprising putting the winding-starting end of the inner liner on the building drum, and attaching the winding-starting end of the inner liner to the building drum via the uncured tape-shaped tacky member applied to the winding-starting end of the inner liner, the winding step comprising winding the inner liner attached to the building drum fully around the building drum, the splicing step comprising applying a winding-finishing end of the wound inner liner onto the uncured tape-shaped tacky member,
   wherein by placing the winding-starting end of the inner liner around the building drum, the uncured tape-shaped tacky member is attached to an outer surface in a tire radial direction of the winding-starting end of the inner liner,
   wherein the carcass ply has reinforcing cords embedded therein, and the inner liner lacks reinforcing cords, and
   wherein the adhesive property of the uncured tacky member is of sufficient strength to hold the winding-starting end on the building drum without suction from the building drum.

2. A method for producing a pneumatic tire having steps of winding an inner liner around a tire building drum to form a cylindrical body, the steps comprising:
   attaching a winding-starting end of the inner liner to the building drum via an uncured tacky member;
   winding the inner liner attached to the building drum around the building drum; and
   splicing a winding-finishing end of the wound inner liner with the winding-starting end of the inner liner via the uncured tacky member to form the cylindrical body,
   wherein the uncured tacky member is an uncured tape-shaped tacky member having an adhesive property on both surfaces thereof enabling adhesion to the winding-starting and winding-finishing ends of the inner liner and to the building drum, the winding-starting end of the inner liner having an inner surface in a tire radial direction and an outer surface in the tire radial direction, whereby the uncured tape-shaped tacky member is applied to both the inner surface of the winding-starting end and the outer surface of the winding-starting end, the attaching step comprising attaching the inner surface of the winding-starting end of the inner liner to the building drum via the uncured tape-shaped tacky member, the winding step comprising winding the inner liner attached to the building drum fully around the building drum, the splicing step comprising applying a winding-finishing end of the wound inner liner onto a portion of the uncured tape-shaped tacky member applied to the outer surface of the winding-starting end.

3. A method for producing a pneumatic tire according to claim 2, wherein the uncured tape-shaped tacky member has a portion applied to the inner surface of the winding-starting end of the inner liner, the portion having a length of 5 mm to 15 mm in a circumferential direction of the drum.

4. A method for producing a pneumatic tire having steps of winding an inner liner around a tire building drum to form a cylindrical body, the steps comprising:
   attaching a winding-starting end of the inner liner directly to the building drum via an uncured tacky member;
   winding the inner liner attached to the building drum around the building drum; and
   splicing a winding-finishing end of the wound inner liner with the winding-starting end of the inner liner via the uncured tacky member to form the cylindrical body;
   applying a tying rubber layer to the inner liner; and
   applying an unvulcanized carcass ply to the tying rubber layer,
   wherein the inner liner has the uncured tacky member applied to at least an outer surface in a tire radial direction of the winding-starting end, the uncured tacky member having an extension portion extending outward of the winding-starting end of the inner liner and having an adhesive property on both surfaces thereof enabling adhesion to the winding-starting and winding-finishing ends of the inner liner and to the building drum, the attaching step comprising attaching the winding-starting end of the inner liner to the building drum by applying the extension portion of the uncured tacky member to the building drum, the winding step comprising winding the inner liner attached to the building drum fully around the building drum, the splicing step comprising applying a winding-finishing end of the wound inner liner onto a portion of the uncured tape-shaped tacky member applied to the outer surface of the winding-starting end,
   wherein the carcass ply has reinforcing cords embedded therein, and the inner liner lacks reinforcing cords, and
   wherein the adhesive property of the uncured tacky member is of sufficient strength to hold the winding-starting end on the building drum without suction from the building drum.

5. A method for producing a pneumatic tire having steps of winding an inner liner around a tire building drum to form a cylindrical body, the steps comprising:
   attaching a winding-starting end of the inner liner to the building drum via an uncured tacky member;

winding the inner liner attached to the building drum around the building drum; and splicing a winding-finishing end of the wound inner liner with the winding-starting end of the inner liner via the uncured tacky member to form the cylindrical body, wherein the inner liner has the uncured tacky member applied to at least an outer surface in a tire radial direction of the winding-starting end, the uncured tacky member having an extension portion extending outward of the winding-starting end of the inner liner, the attaching step comprising attaching the winding-starting end of the inner liner to the building drum by applying the extension portion of the uncured tacky member to the building drum, the winding step comprising winding the inner liner attached to the building drum fully around the building drum, the splicing step comprising applying a winding-finishing end of the wound inner liner onto a portion of the uncured tape-shaped tacky member applied to the outer surface of the winding-starting end, wherein the uncured tacky member comprises an uncured sheet-shaped tacky member applied to an entire outer surface, from the winding-starting end to the winding-finishing end, of the inner liner.

6. A method for manufacturing a pneumatic tire according to claim 4, wherein the extension portion of the uncured tacky member has a length of 5 mm to 15 mm in a circumferential direction of the drum.

7. A method for manufacturing a pneumatic tire according to claim 1, wherein the uncured tacky member comprises at least two tacky layers having different adhesions, the at least two tacky layers comprising an inner tacky layer facing the building drum and an outer tacky layer disposed outward thereof, the inner tacky layer being lower in adhesion than the outer tacky layer.

8. A method for manufacturing a pneumatic tire according to claim 1, wherein the uncured tacky member contains an epoxidized styrene-butadiene-styrene block copolymer.

9. A method for manufacturing a pneumatic tire according to claim 1, wherein the uncured tacky member has a thickness of 0.3 mm to 3.0 mm.

10. A method for manufacturing a pneumatic tire according to claim 1, wherein the inner liner has at least a film on a side thereof facing the building drum, the film being formed of a thermoplastic resin or a thermoplastic elastomer composition comprising a blend of a thermoplastic resin and an elastomer.

* * * * *